(No Model.) 2 Sheets—Sheet 2.
D. F. HARTFORD.
AUTOMATIC VARIABLE SPEED AND STOP MECHANISM.
No. 579,870. Patented Mar. 30, 1897.
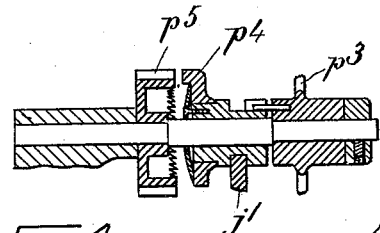
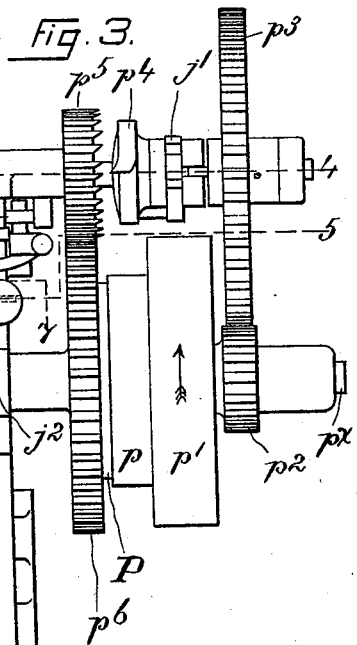
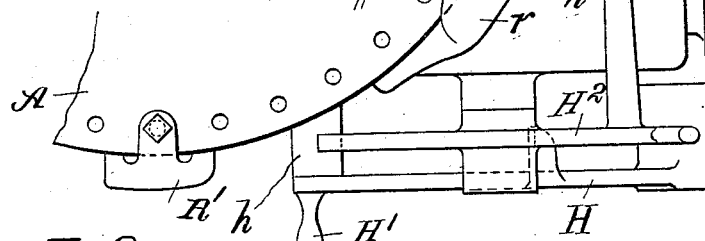
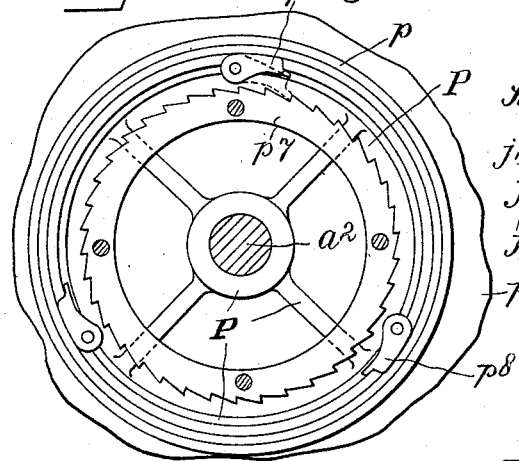
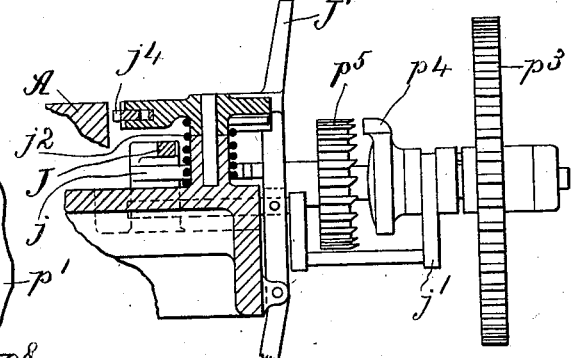
WITNESSES:
INVENTOR
David Frank Hartford
BY
Maynadier & Mitchell
ATTORNEYS.

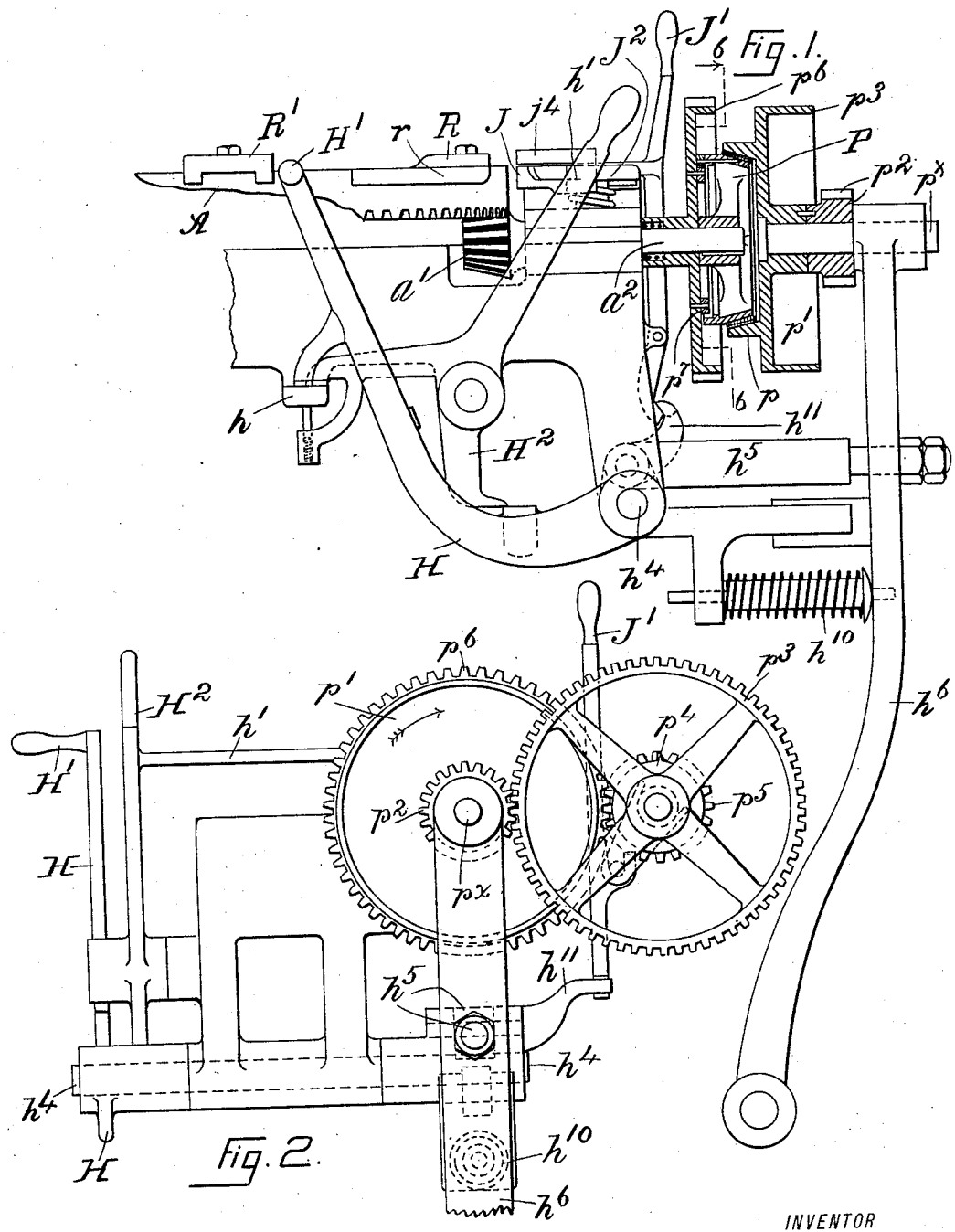

United States Patent Office.

DAVID FRANK HARTFORD, OF BOSTON, MASSACHUSETTS.

AUTOMATIC VARIABLE-SPEED AND STOP MECHANISM.

SPECIFICATION forming part of Letters Patent No. 579,870, dated March 30, 1897.

Application filed March 2, 1896. Serial No. 581,599. (No model.)

*To all whom it may concern:*

Be it known that I, DAVID FRANK HARTFORD, of Boston, in the county of Suffolk and State of Massachusetts, have invented a new and useful Automatic Variable-Speed and Stop Mechanism, of which the following is a specification, reference being had to the accompanying drawings, in which—

Figure 1 is an elevation, partly in section, of my mechanism, a portion of a sole-rounding machine to which the mechanism is attached being shown. Fig. 2 is a partial elevation of Fig. 1. Fig. 3 is a plan of Fig. 1. Fig. 4 is a section on line 4 4 of Fig. 3. Fig. 5 is a section on line 5 5 of Fig. 3. Fig. 6 is a section on line 6 6 of Fig. 1, enlarged for clearness. Fig. 7 is a section on line 7 7 of Fig. 3.

My invention is, first, a mechanism for automatically varying the speed of a shaft and for automatically stopping the shaft; and, second, means to insure the change from a high to a lower speed without shock and without allowing the shaft to fall, even momentarily, below the minimum speed.

In all the drawings the mechanism is shown as it is at full speed and in Figs. 1 and 2 as about to be automatically shifted from full speed to slow speed and then automatically stopped.

The gear A is revolved by the pinion $a'$ on shaft $a^2$, and shaft $a^2$ is driven through clutch member P, fast to shaft $a^2$. Clutch member $p$ is fast to pulley $p'$, and the driving-belt drives pulley $p'$ and also pinion $p^2$, which is also fast to pulley $p'$, all three—member $p$, pulley $p'$, and pinion $p^2$—revolving on stud $p^\times$, which is fast at the upper end of arm $h^6$. Arm $h^6$ is swung in and out by rock-shaft $h^4$ and rod $h^5$, the inner end of rod $h^5$ being pinned to a short arm on rock-shaft $h^4$ and the outer end of rod $h^5$ being secured to arm $h^6$, so that when rock-shaft $h^4$ is turned in one direction arm $h^6$ is swung in against the force of spring $h^{10}$, which swings arm $h^6$ back when rock-shaft $h^4$ is turned in the opposite direction. Rock-shaft $h^4$ is fast to starting-lever H, so that when the handle H' on lever H is thrown down, as in Fig. 1, the arm $h^6$ is swung in and clutch members $p$ and P pressed together and shaft $a^2$ set in motion, and gear A revolves at full speed so long as arm $h^6$ is held against the force of spring $h^{10}$. When lever H is forced down to start the mechanism, it is locked in its depressed position by the locking-lever $H^2$, which catches on a projection on the side of lever H, as shown in Fig. 1, and lever $H^2$ is controlled by stop $h$, an arm on lever $H^2$ bringing up against stop $h$ when lever $H^2$ is moved in one direction, while a spring-plunger working against stop $h$ (see Fig. 1) tends to move lever $H^2$ in the other direction. Stop $h$ also prevents the undue depression of lever H. It will now be plain that to start the mechanism lever H is depressed and locked in its depressed position by locking-lever $H^2$, thus clutching members $p$ P, while, to stop, locking-lever $H^2$ must be moved to unlock lever H and allow spring $h^{10}$ to unclutch P and $p$.

In Figs. 1 and 2 the stopping-dog R is shown in its position just before its outer surface $r$ engages the inner end of lever J and forces that end to the right, carrying with it arm $h'$, which is fast to locking-lever $H^2$, and thus unlocking starting-lever H, when spring $h^{10}$ swings arm $h^6$ to unclutch P $p$, and this would stop the mechanism were it not that the outer end of lever J moves catch $j$ out of the way of lever J', and as lever J' controls the shifter $j'$ that shifter, as well as lever J', is moved to the left by the force of spring $k$, thus causing clutch member $p^4$ to engage member $p^5$. As gear $p^3$ is rotated by pinions $p^2$, and as $p^4$ rotates with $p^3$, the clutching of $p^4$ and $p^5$ starts $p^5$, which is not only a clutch member, but also a pinion meshing with gear $p^6$, the result being that gear $p^6$ is revolved with a slow speed. The ratchet $p^7$ is fast to gear $p^6$, and when shaft $a^2$ has slowed up (after lever H is unlocked and clutch P $p$ unclutched) ratchet $p^7$ soon begins to move as fast as clutch member P, when ratchet $p^7$ engages the pawls $p^8$, carried by clutch member P, whereupon clutch member P is driven by ratchet $p^7$ and a slow speed thus imparted to shaft $a^2$. The pawls $p^8$ are held from engagement with ratchet $p^7$ by centrifugal force so long as member P is driven by engagement with member $p$; but as soon as this clutch P $p$ is unclutched the speed of P falls rapidly, and the pawls $p^8$ engage with ratchet $p^7$ soon after clutch P $p$ is unclutched and clutch $p^4$ $p^5$ clutched, so that shaft $a^2$ is kept in rotation, but at a much slower speed. Shortly after the speed of shaft $a^2$ and gear A is thus automatically reduced by the action of dog R the notch in dog R engages the end of stopping-lever J² and turns that lever against the force of its spring $j^2$, and the motion of stopping-lever J² moves lever J' to unclutch $p^4\ p^5$, when lever J' is caught by catch $j$, and the shaft $a^2$ is thus brought to a stop, for as soon as clutch $p^4\ p^5$ is unclutched gear $p^6$ ceases to revolve, and as ratchet $p^7$ is then driven through gear $p^6$ that ratchet also ceases to revolve. The gear A is thrown back a little as stopping-lever J² is forced back by its spring $j^2$ against its stop $j^3$, and the spring-latch $j^4$ in lever J² prevents the gear A being thrown back too far. The momentum of the parts at slow speed is sufficient to insure the full operation of dog R on stopping-lever J² and yet not enough to move dog R far enough to cause its notch to move clear of lever J², and the mechanism is always stopped at the same point although gear A moves slightly beyond that point and is moved back to that point by the action of lever J² in the notch of dog R, so that by adjusting dog R on gear A that gear will be stopped at the exact point desired in each revolution. When the gear A is thus stopped automatically first by unclutching the fast-speed clutch P $p$ and clutching the slow-speed clutch $p^4\ p^5$, the starting-lever H will be in its upper position and will not be depressed, as shown in Fig. 1, and the mechanism will be ready to make a new revolution. The starting-lever H will then be depressed and arm $h^6$ swung in, starting shaft $a^2$ at full speed, as above explained, so that dog R will move lever J² against the force of its spring $j^2$ as gear A revolves at its fast speed, but dog R' throws out the inner end of lever J' when the speed of gear A is to be changed from fast to slow, the operation being the same as when lever J' is actuated by the surface $r$ of dog R, except that the cam-surface of dog R' engages with latch $j^4$, which is adjustable on lever J', so that it may be turned out of the way.

The dog R' is adjustable on gear A, so that the change from fast to slow can be made automatically at any desired part of a revolution. Usually one dog R' is sufficient, but in some cases I use three. After any dog R' has operated I change from slow to fast by depressing lever H.

The mechanism can be stopped when at full speed by throwing the handle of lever H² to the right, thereby releasing lever H and permitting spring $h^{10}$ to throw arm $h^6$ to the right, unclutching $p$ P, the other clutch $p^4\ p^5$ being then unclutched. At slow speed the mechanism is stopped by moving the handle of lever J' to the right, thereby unclutching $p^4\ p^5$, the other clutch $p$ P being then unclutched.

When the mechanism is running at slow speed and it is desired to change to full speed, the operator presses handle H' of lever H, thus moving $h^6$ through rock-shaft $h^4$ and rod $h^5$ and compressing spring $h^{10}$, the lever H being held down by locking-lever H². (See Fig. 1.) The clutch P $p$ is thrown into operation by the movement of $h^6$. The initial movement of lever H through rock-shaft $h^4$ moves finger $h^{11}$ against the lower end of lever J', throwing the upper end of lever J' to the right against the force of spring $k$ (see Fig. 7) and unclutching clutch $p^4\ p^5$. (See Figs. 1, 3, and 5.)

What I claim as my invention is—

1. In combination, a driving-gear; a driven gear; a clutch one member of which is fast to the shaft of the driving-gear and its other member on an axis in line with the axis of the driving-gear; a gear fast to the outer member of that clutch; a second gear meshing with that gear; a third gear on an axis in line with the second gear; a clutch between the second and third gears; a fourth gear on the axis of the driving-gear; and in mesh with the third gear; automatic mechanism substantially such as described for throwing one clutch out of gear while throwing the other clutch into gear, to vary the speed; and automatic stop mechanism to throw both clutches out of gear; all organized substantially as described.

2. In combination a driving-gear; a driven gear; a clutch one member of which is fast to the shaft of the driving-gear, and its other member on an axis in line with the axis of the driving-gear; a gear fast to the outer member of that clutch; a second gear meshing with the first; a third gear on an axis in line with the second gear; a clutch between the second and third gears; a fourth gear loose on the axis of the driving-shaft; a pawl-and-ratchet connection between the fourth gear and that member of the clutch fast to the driving-shaft; and mechanism for actuating the clutches, substantially as described.

3. In combination driving-shaft $a^2$; gear $p^6$ loose on that shaft; clutch member P fast to that shaft; ratchet $p^7$ fast to gear $p^6$; the other clutch member $p$; and pawls $p^8$ fast to clutch member P; the pawls being held away by centrifugal force from the ratchet when $p$ engages P, but engaging the ratchet when power is applied through gear $p^6$, and when $p$ and P are out of engagement; all substantially as described.

DAVID FRANK HARTFORD.

Witnesses:
JOHN R. SNOW,
H. P. GUILLO.